(12) United States Patent
Sun et al.

(10) Patent No.: US 10,470,283 B2
(45) Date of Patent: Nov. 5, 2019

(54) DISCHARGE METHOD AND CIRCUIT FOR USB CONNECTOR

(71) Applicant: SEMICONDUCTOR COMPONENTS INDUSTRIES, LLC, Phoenix, AZ (US)

(72) Inventors: WeiMing Sun, Beijing (CN); Jianli Chen, Beijing (CN)

(73) Assignee: Semiconductor Components Industries, LLC, Phoenix, AZ (US)

( * ) Notice: Subject to any disclaimer, the term of this patent is extended or adjusted under 35 U.S.C. 154(b) by 383 days.

(21) Appl. No.: 15/453,354

(22) Filed: Mar. 8, 2017

(65) Prior Publication Data

US 2017/0290134 A1 Oct. 5, 2017

(30) Foreign Application Priority Data

Mar. 29, 2016 (CN) .................. 2016 1 01905414

(51) Int. Cl.
*H05F 3/04* (2006.01)
*H01R 24/64* (2011.01)
(52) U.S. Cl.
CPC .............. *H05F 3/04* (2013.01); *H01R 24/64* (2013.01)
(58) Field of Classification Search
CPC ...... H05F 3/04; H01R 4/64; H01L 2924/0002
USPC ........................................................ 361/220
See application file for complete search history.

(56) References Cited

U.S. PATENT DOCUMENTS

| 5,850,159 | A | 12/1998 | Chow et al. |
| 7,289,925 | B2 | 10/2007 | Grimes et al. |
| 7,843,235 | B2 | 11/2010 | Yanbo et al. |
| 8,975,962 | B2 | 3/2015 | Bohannon et al. |
| 9,621,138 | B1 | 4/2017 | Zhang et al. |
| 2017/0133931 | A1 | 5/2017 | Elsayed et al. |

(Continued)

FOREIGN PATENT DOCUMENTS

| CN | 200947542 Y | 9/2007 |
| CN | 103472882 A | 12/2013 |
| CN | 103902009 A | 7/2014 |

OTHER PUBLICATIONS

Zhang, Dongdong et al., "Lithium-ion Battery Charging from USB and Charging Circuit", Electronic Component & Device Applications, vol. 6, No. 6, Jun. 2004, 3 pages.

*Primary Examiner* — Dharti H Patel
(74) *Attorney, Agent, or Firm* — Brake Hughes Bellermann LLP

(57) ABSTRACT

This document discusses, among other things, a discharge circuit for a USB connector configured to discharge a voltage of a pin (e.g., a VBUS pin) of the USB connector. The discharge circuit can include a discharge load to discharge the voltage of the pin; a first control circuit to adjust the magnitude of the discharge load during discharging, such that power consumption generated by the discharge load meets a first preset condition and a discharge time is within a first preset range, the first preset condition indicating that the generated power consumption does not trigger Over Temperature Protection (OTP); and a second control circuit to detect whether the voltage of the pin is changed based on a reference voltage during discharging and adjust the magnitude of the discharge load in response to the change, such that a slew rate of the voltage of the first pin is within a second preset range.

20 Claims, 5 Drawing Sheets

(56) References Cited

U.S. PATENT DOCUMENTS

2017/0242707 A1* 8/2017 Hays .................... G06F 13/385
2018/0019587 A1* 1/2018 Chen .................... H02H 7/1213

* cited by examiner

DISCHARGE METHOD AND CIRCUIT FOR USB CONNECTOR

CLAIM OF PRIORITY

This application claims the benefit of priority under 35 U.S.C. § 119(a) of WeiMing Sun et al. C N Application No. 2016101905414, filed on Mar. 29, 2016, which is hereby incorporated by reference in its entirety.

TECHNICAL FIELD

The present invention relates generally to universal serial buses (USBs), and more particularly to a discharge method and circuit for a USB connector.

BACKGROUND

USB connectors have been widely used in electronic devices such as power adapters, mobile power sources, notebook computers, mobile phones, and tablet computers. The USB connectors may be used for charging and data transmission functions. Operation of USB connectors is standardized through a USB standard.

A recently released USB Type-C cable and connector specification defines a new Type-C USB connector that meets the USB 3-1 protocol of the USB specification. The Type-C USB connector has a higher data rate, a higher configurable charging current, and supports bidirectional insertion of a USB plug into a USB socket as compared to the previous Type-B USB connector.

When a Type-C USB connector and a corresponding cable is used to connect an upstream facing port (UFP) of an electronic device to a downstream facing port (DFP) of another electronic device, the DFP device may output a voltage to the UFP device through a pin of the USB connector. After removal of the cable, the VBUS pin of the connector should be discharged. At present, related protocols of the Type-C USB specify various principles (including power consumption, discharge time, slew rate (SR), and the like) that should be followed in the process of discharging the voltage of the VBUS pin. However, no effective solution of controlling the process of discharging the voltage of the VBUS pin according to specifications of the related protocols of the Type-C USB has been found yet.

The information disclosed above in the Background is merely intended to facilitate the understanding of the background of the present subject matter. Therefore, it may contain information beyond what those of ordinary skills in the art might have known about the prior art.

SUMMARY

To solve a technical problem in the related art, embodiments of the present subject matter provide a signal receiving circuit and method, and a signal detecting circuit.

An embodiment of the present subject matter can provide a discharge circuit for a USB connector, configured to discharge the voltage of a first pin of the USB connector. The discharge circuit can comprise a discharge load configured to discharge the voltage of the first pin, a first control circuit configured to adjust the magnitude of the discharge load during discharging such that power consumption generated by the discharge load meets a first preset condition, and discharge time is within a first preset range, the first preset condition indicating that the generated power consumption does not trigger Over Temperature Protection (OTP), and a second control circuit, configured to detect whether the voltage of the first pin is changed based on a reference voltage during discharging, and adjust the magnitude of the discharge load in response to the change, such that a slew rate of the voltage of the first pin is within a second preset range.

An embodiment of the present subject matter can provide a discharge method for a USB connector, comprising discharging, by using a discharge load, the voltage of a first pin of the USB connector, adjusting the magnitude of the discharge load during discharging, such that power consumption generated by the discharge load meets a first preset condition, and discharge time is within a first preset range, the first preset condition indicating that the generated power consumption does not trigger OTP, and detecting whether the voltage of the first pin is changed based on a reference voltage during discharging, and adjusting the magnitude of the discharge load in response to the change, such that a slew rate of the voltage of the first pin is within a second preset range.

The discharge method and circuit for a USB connector provided in the embodiments of the present subject matter adjust the magnitude of a discharge load in the process of discharging the voltage of a first pin of the USB connector by using the discharge load. The power consumption generated by the discharge load meets a first preset condition that indicates that the generated power consumption does not trigger OTP. A time for discharging the voltage is within a first preset range. The detection of the voltage of the first pin of the USB connector is changed based on a reference voltage during discharging, and the magnitude of the discharge load is adjusted in response to the change, such that a slew rate of the voltage of the first pin of the USB connector is within a second preset range. In this way, the process of discharging the first pin can be effectively controlled.

BRIEF DESCRIPTION OF THE DRAWINGS

In the drawings, which are not necessarily drawn to scale, liker reference numerals may describe similar components in different views. Similar reference numerals having different letter postfixes can represent different examples of similar components. The accompanying drawings substantially show, in an exemplary manner rather than a limitative manner, embodiments discussed in this text.

DETAILED DESCRIPTION

Figure 1:
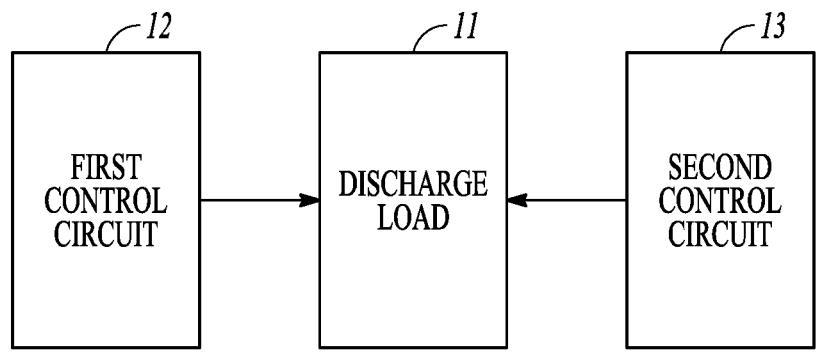
FIG. 1 illustrates a block diagram of a first discharge circuit for a USB connector according to an embodiment.

The following simply describes certain exemplary embodiments. Various modifications may be made to the embodiments under description without departing from the spirit or scope of the present subject matter, just as possibly known by those skilled in the art. Thus, the drawings and description are essentially considered as illustrative rather than restrictive.

A DFP device may be defined as a Host. For example, the DFP device can act as a power supply to supply power to an electronic device. A UFP device may act as an electronic device. For example, the UFP device can be a USB flash drive, a hard disk drive, a computer, or other electronic devices that can receive power from the power supply, have data written to, or data read from over a USB cable having a USB connector.

A Dual Role Port (DRP) device can act as a DFP device (e.g., host) or a UFP device (e.g., electronic device). The DRP can also dynamically switch between acting as a DFP device and acting as a UFP device or vice versa. For example, the DRP devices can be a computer (which may be used as a Host of the USB flash drive, and may also be used as a UFP device being charged), a mobile phone having an on-the-go (OTG) function (which may be used as a device, which is charged and data is read from/written to, and may also be used as a Host to provide a power source for other devices or read/write data from/into a USB flash drive), or a power source (which may be discharged and charged by using a single USB Type-C interface).

A VBUS pin or VBUS refers to the USB connector pin with accompanying wire cable that carries the VBUS voltage between connectors. The VBUS voltage can be used to charge the UFP device from the power supply voltage. A slew rate (SR) is a rate of voltage change of the VBUS voltage over time.

After the UFP device is connected to the DFP device through the Type-C USB connector and the corresponding cable, the DFP device may convey the VBUS voltage from the power supply to the UFP device through the VBUS to supply power to the UFP device. Since a capacitance in the cable may store the voltage, the VBUS should to be discharged to remove any voltage on the cable and ensure safe operation of the cable.

Table 1 illustrates an example of operating conditions for a VBUS. Other embodiments may use other operating conditions.

TABLE 1

| Symbol | Parameter | Minimum Voltage (Min) | Typical Voltage (TYP) | Maximum Voltage (Max) | Unit |
|---|---|---|---|---|---|
| VBUS | VBUS Supply voltage | 4 | 5 | 21.5 | V |

The Type-C USB connector supports a higher charging current than previous USB connectors (e.g., Type-B) in order to provide a higher power transmission capacity (e.g., up to 100 W). The following VBUS voltage discharge modes are mainly specified in related protocols of the Type-C USB:

(1) Auto Sink and Source Discharge after a disconnect of the Type-C USB connector: VBUS Discharge from 21.5 V to vsafe0V, where vsafe0V refers to a safe working voltage of 0V;

(2) Auto Sink Discharge after a disconnect state only: VBUS Discharge from 16 V to vsafe5V, where vsafe5V refers to a safe working voltage of 5V. In this mode, a discharge time parameter is referred to as tSinkDischargeFull;

(3) Auto Source Discharge during a connection state only: VBUS Discharge from 21.5 V to vsafe5V.

Table 2 illustrates an example of operating conditions for achieving the vsafe0V and vsafe5V voltages.

TABLE 2

| Symbol | Parameter | T = −40° C. to 85° C. | | Unit |
|---|---|---|---|---|
| vsafe0V | The safe working voltage is 0 V | 0.6 | 0.8 | V |
| vsafe5V | The safe working voltage is 5 V | 4.75 | 5.5 | V |

Related protocols of the Type-C USB specify various principles, including power consumption, discharge time, SR, and the like, that should be followed in the process of discharging the VBUS. For example, (1) Power consumption during discharging should not trigger the device to implement Over Temperature Protection (OTP); otherwise, the device cannot work normally.

(2) When a capacitance is 1 µF to 100 µF (a generally used value), the discharge time parameter (tSinkDischargeFull) should be less than or equal to 50 ms.

(3) The SR should be less than or equal to 30 mV/µs during discharging. A relatively high SR can cause an analog-to-digital converter (ADC) for detecting the VBUS voltage to fail to identify the voltage value of the VBUS.

Based on these principles, the present embodiments adjust the magnitude of a discharge load during the discharging of the VBUS voltage by using a discharge load. The power consumption of the discharge load meets a first preset condition, and discharge time is within a first preset range, the first preset condition indicating that the generated power consumption does not trigger OTP; and it is detected whether the voltage of the first pin is changed based on a reference voltage. The magnitude of the discharge load is adjusted in response to the change, such that a slew rate of the voltage of the first pin is within a second preset range.

It should be noted that, "first", "second" and the like used in this text merely represent elements at different locations, and do not limit parameters or functions of the elements.

FIG. 1 illustrates a schematic diagram of a first discharge circuit for a USB connector according to an embodiment. This embodiment provides a discharge circuit for a USB connector, configured to discharge the voltage of a first pin (e.g., VBUS) of the USB connector. As shown in FIG. 1, the discharge circuit includes: a discharge load 11, a first control circuit 12, and a second control circuit 13.

The discharge load 11 discharges the voltage of the first pin. During discharging, the first control circuit 12 adjusts the magnitude of the discharge load 11, such that power consumption generated by the discharge load 11 meets a first preset condition, and discharge time is within a first preset range, the first preset condition indicating that the generated power consumption does not trigger OTP. The second control circuit 13 detects whether the voltage of the first pin is changed based on a reference voltage and adjusts the magnitude of the discharge load 11 in response to the change, such that a slew rate of the voltage of the first pin is within a second preset range. In this way, the process of discharging the first pin can be effectively controlled.

The first preset condition can be set according to related parameters for triggering the OTP of the circuit. These parameters can include a triggering threshold, a thermal resistance of a circuit, or a max ambient environment temperature. The first preset range and the second preset range may be set according to specifications of any USB related protocol.

The first pin can be a power pin for the USB connector and accompanying cable. When the USB connector is a Type-C USB connector, the power pin refers to a VBUS pin. The discharge circuit and method are not limited to the scenario of the USB Type-C, but are applicable to any USB connector compatible to a USB Type-C connector.

Figure 2:
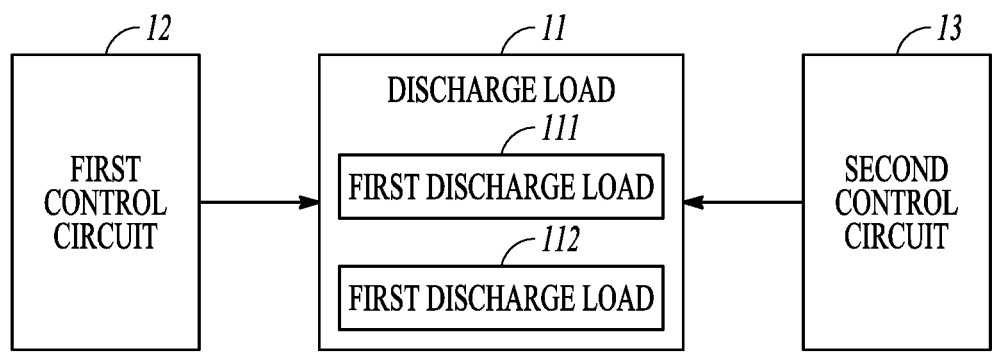
FIG. 2 illustrates a block diagram of a second discharge circuit for a USB connector according to an embodiment.

FIG. 2 illustrates a schematic diagram of a second discharge circuit for a USB connector according to an embodiment. The discharge load 11 includes a first discharge load 111 and a second discharge load 112. In an embodiment, the first discharge load 111 is less than the second discharge load 112.

During the discharge process, the first discharge load 111 relatively constantly discharges the voltage of the first pin. At substantially the same time, the first control circuit 12 detects whether the voltage of the first pin is less than a first threshold and generates an enable signal when the detection result indicates that the voltage of the first pin is less than the first threshold. The second discharge load 112 discharges the voltage of the first pin in response to the enable signal generated by the first control circuit 12. The first threshold can be determined using simulation experiments.

Herein, in the process of discharging the voltage of the first pin from a high voltage to a low voltage, when the voltage of the first pin is relatively high, the first discharge load 111 having a smaller magnitude is used for discharging, and in this way, power consumption may be reduced effectively. When the voltage of the first pin is reduced to a certain value, the first discharge load 111 and the second discharge load 112, that has a larger magnitude, are used together to discharge the voltage of the first pin simultaneously. Thus, the discharge process can be completed relatively quickly, thereby meeting the requirement on the discharge time specified in the USB protocol.

The magnitudes of the first discharge load 111 and the second discharge load 112 may be determined through simulation experiments.

Figure 3:
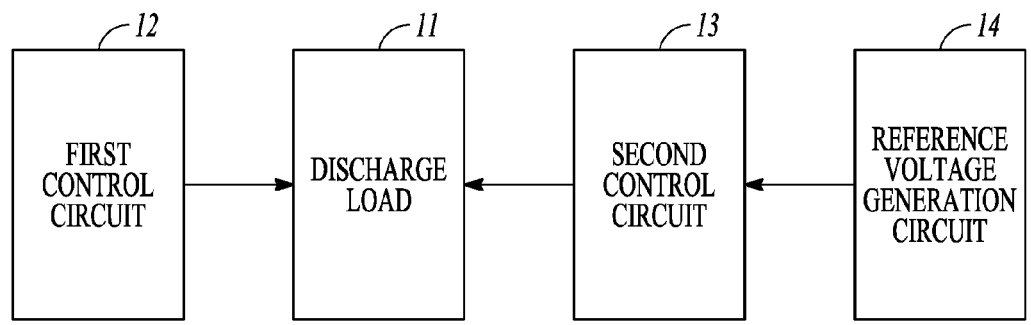
FIG. 3 illustrates a block diagram of a third discharge circuit for a USB connector according to an embodiment.

FIG. 3 illustrates a schematic diagram of a third discharge circuit for a USB connector according to an embodiment. The discharge circuit may further include a reference voltage generation circuit 14. In the discharge process, the reference voltage generation circuit 14 provides a variable reference voltage for the second control circuit 13 at a reference voltage node. In an embodiment, the provided variable reference voltage can be greater than a second threshold. The second threshold can be set through simulation experiments. Setting the second threshold can be based on factors such as the magnitude of a discharge current, normal work of the circuit, or an SR specified by the USB protocol.

In the discharge process, the second control circuit 13 adjusts the magnitude of the discharge load 11 according to that the voltage of the first pin is changed based on a reference voltage, such that a slew rate of the voltage of the first pin is within a second preset range.

Specifically, when the voltage of the first pin is greater than the reference voltage, the second control circuit 13 reduces the discharge load 11. Correspondingly, when the voltage of the first pin is lower than the reference voltage, the second control circuit 13 increases the discharge load 11.

When the voltage of the first pin is greater than the reference voltage, it indicates that the SR of the voltage of the first pin is less than the SR of the reference voltage. At this point, the discharge load 11 should be increased to quickly pull down the voltage of the first pin, thereby increasing the SR of the voltage of the first pin.

When the voltage of the first pin is less than the reference voltage, it indicates that the SR of the voltage of the first pin is greater than the SR of the reference voltage. At this point, the discharge load 11 should be reduced, to reduce capacity of pulling down the voltage of the first pin, thereby reducing the SR of the voltage of the first pin.

Figure 4:
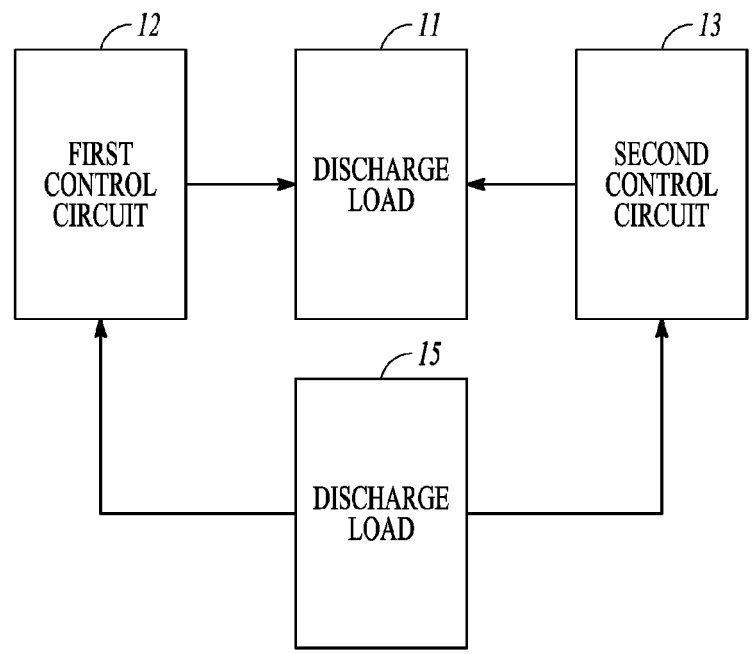
FIG. 4 illustrates a block diagram of a fourth discharge circuit for a USB connector according to an embodiment.

FIG. 4 illustrates a schematic diagram of a fourth discharge circuit for a USB connector according to an embodiment. The fourth discharge circuit further includes a third control circuit 15, for providing enable signals for the first control circuit 12 and the second control circuit 13. Correspondingly, the first control circuit 12 adjusts, in response to the enable signal, the magnitude of the discharge load 11 during discharging, such that power consumption generated by the discharge load 11 meets a first preset condition, and discharge time is within a first preset range.

The second control circuit 13 detects, in response to the enable signal, whether the voltage of the first pin is changed based on the reference voltage during discharging. When the voltage of the first pin is changed based on the reference voltage, the second control circuit 13 adjusts the magnitude of the discharge load 11 in response to the change, such that the SR of the voltage of the first pin is within a second preset range.

It can be seen from the above descriptions that the discharge circuit may take three factors including power consumption, SR, and discharge time into consideration in the process of discharging the voltage of the first pin by using the discharge load 11, thereby being capable of effectively controlling the process of discharging the first pin.

Figure 5:
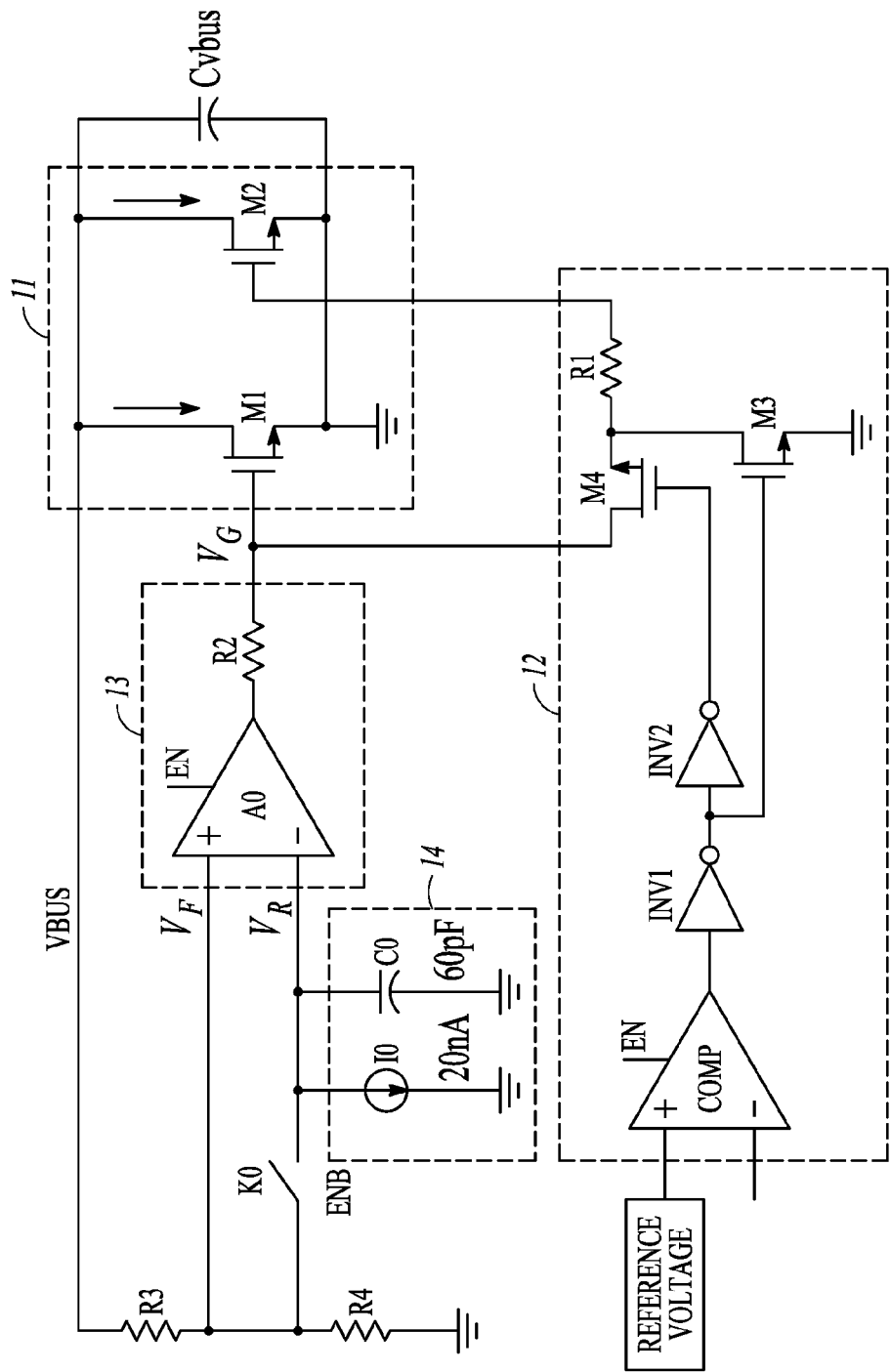
FIG. 5 illustrates a schematic diagram of a discharge circuit for a USB connector according to an embodiment.
Figure 6:
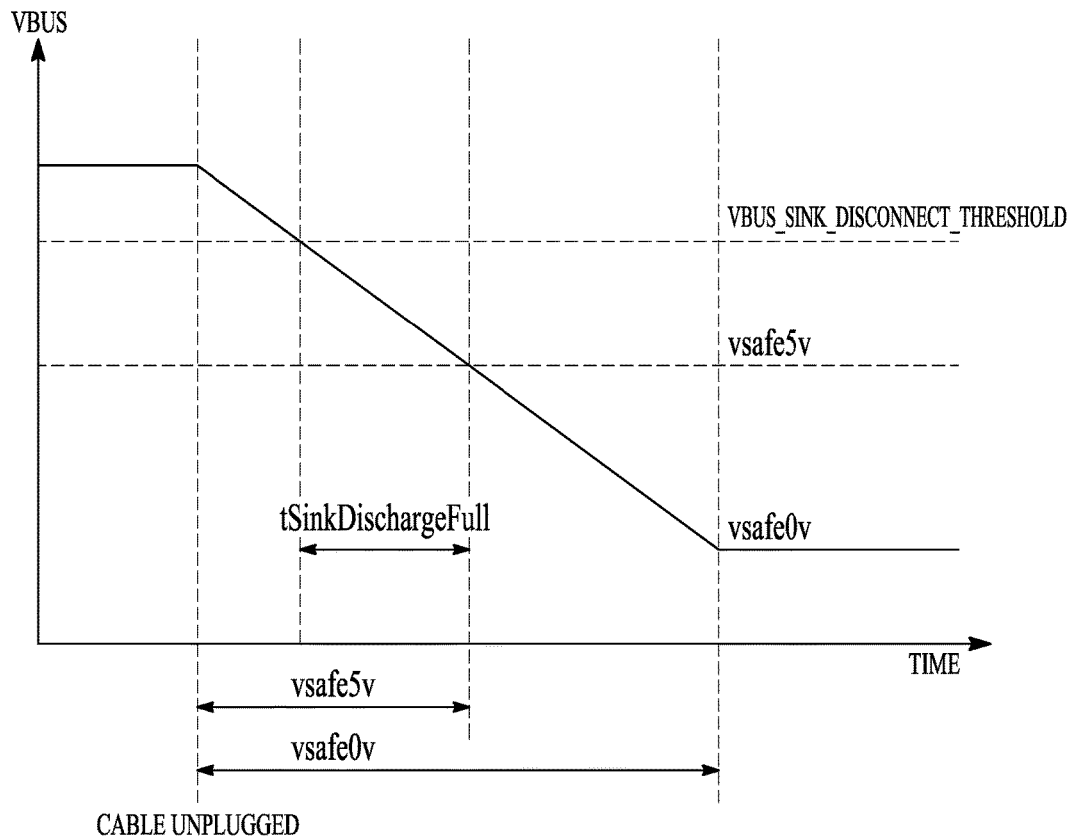
FIG. 6 illustrates a plot of a VBUS voltage versus time in the process of discharging a VBUS pin according to an embodiment.

The above-described circuit and method for a discharge circuit are illustrated in an example embodiment of FIGS. 5 and 6. FIG. 5 illustrates a schematic diagram of a discharge circuit for a USB connector according to an embodiment The embodiment of FIG. 5 illustrates a circuit that is specific to a Type-C USB connector where the corresponding first pin is a VBUS. Additionally, this application embodiment follows related parameters listed in Table 1 and Table 2 above when being designed. At the same time, it also follows related parameters shown in Table 3.

TABLE 3

| Design Requirements | The definition of these Design Requirements |
| --- | --- |
| tsafe0v ≤650 ms | VBUS Discharge from 21.5 V to vsafe0v in Auto Sink and Source Discharge after a disconnect |
| tsafe5v ≤275 ms | VBUS Discharge from 21.5 V to vsafe5v in Auto Sink and Source Discharge after a disconnect |
| tSinkDischargeFull ≤50 ms | VBUS Discharge from 16 V to vsafe5v in Auto Sink Discharge after a disconnect state only |
| vSrcSlewNeg ≤30 mV/μs | VBUS Discharge from 21.5 to vsafe5v in Source Discharge during a connection state only |

FIG. 6 illustrates a plot of a VBUS voltage versus time in the process of discharging a VBUS pin according to an embodiment. Graphical representations of discharge time represented by tsafe0v, tsafe5, and tSinkDischargeFull, respectively, are shown in the plot of FIG. 6. As used herein, VBUS_SINK_DISCONNECT_THRESHOLD can be defined by when a VBUS voltage of a sink is less than VBUS_SINK_DISCONNECT_THRESHOLD, it indicates that the sink is in a disconnect state. The VBUS_SINK_DISCONNECT_THRESHOLD may be configured by using an I2C register as defined in USB protocols.

Various operation parameters are assumed for the example embodiments of FIGS. 5 and 6. For example, the thermal resistance is 70° C./W, the max ambient environment temperature is 85° C., a rising threshold of the OTP is 145° C., and a capacitance range of a capacitor Cvbus in the circuit is 1 uF to 100 uF.

Herein, it is assumed that the power consumption generated by discharging the VBUS pin represented by Pdis. The power consumption generated by discharging the VBUS pin may not trigger OTP, 85° C.+Pdis*70<145. It can be assumed that Pdis<0.86 W. In an example, the power consumption generated by discharging the VBUS pin is less than a range of 0 W to 86 W.

It can be seen from Table 3 that, in the discharging modes of the VBUS voltage, tSinkDischargeFull is the shortest among limits on the discharge time parameters. Thus, tSinkDischargeFull is the most basic factor when parameters of devices of the circuit in this application embodiment are designed.

With reference to FIG. 5, the discharge load 11 includes: a first N-channel metal oxide semiconductor field effect transistor (NMOS) M1, and a second NMOS M2, coupled in parallel with M1. While the embodiment of FIG. 5 shows the discharge load 11 as comprising two transistors, other embodiments may use other types of loads. For example, the discharge load 11 (e.g., means for discharging) can be any device that absorbs energy in the discharge system.

The first control circuit 12 (e.g., means for adjusting) includes a comparator COMP, a first inverter INV1, a second inverter INV2, a third NMOS M3, a fourth NMOS M4, and a first resistor R1. The second control circuit 13 (e.g., means for adjusting) includes an error amplifier A0 and a second resistor R2; and the reference voltage generation circuit 14 includes a current source IO and a capacitor C0.

The circuit shown in FIG. 5 further includes a third resistor R3, a fourth resistor R4, a switch K0, and a capacitor Cvbus. The capacitor Cvbus represents the capacitance of the VBUS. In an embodiment, the resistance ratio of the third resistor R3 to the fourth resistor R4 is 9:1. This provides a voltage divider circuit to provide the correct voltage at the input of the amplifier A0.

In the following operation description, the VBUS pin and cable is represented by VBUS. The voltage at an in-phase input end of the error amplifier A0 and a negative pole of the comparator COMP is represented by VF. The voltage at a reverse input end of the error amplifier A0 is represented by VR. The voltage at a node formed by the second resistor R2, the first NMOS M1, and the fourth NMOS M4 is represented by VG. A positive pole of the comparator COMP receives a reference voltage VBG.

In the illustrated embodiment, a negative feedback loop (adjusting the magnitude of VG) is formed by using the error amplifier A0, to control the SR of discharging the VBUS pin. Based on this, in the circuit provided in this application embodiment, the following formulas are met:

$$\frac{dV_F}{dT} \pounds\ 30\ \text{nA}/10\ \text{pF} \tag{1}$$

This is because:

$$Q=CDV=IDT \tag{2}$$

Wherein, Q denotes the quantity of electricity, C denotes the capacitance, V denotes the voltage, I denotes the current, and T denotes time.

Formula (2) is deformed to obtain:

$$\frac{DV}{DT} = \frac{I}{C} \tag{3}$$

By means of formula (3), in combination with the circuit provided in this application embodiment, it may be obtained that:

$$\frac{DV}{DT} = \frac{I}{C} \mathbf{Þ} \frac{dV_{BUS}}{dT} = \frac{I}{C} \mathbf{Þ} \frac{10*dV_F}{dT} = \frac{I}{C} \mathbf{Þ} \frac{dV_F}{dT} = \frac{I}{10C};$$

at the same time, 30 mv/ms=30 mA/mF=300 nA/pF; moreover, because $$\frac{dV_{BUS}}{dT} \pounds\ 30\ \text{mv/ms} = 300\ \text{nA}/10\ \text{pF};$$

therefore, $$\frac{dV_F}{dT} \pounds\ 30\ \text{n}/10\ \text{pF}.$$

Because $$\frac{dV_F}{dT} \pounds\ 30\ \text{n}/10\ \text{pF},$$

considering the magnitude (power consumption) of a charging current, in this application embodiment, an SR threshold is set to 25 nA/60 pF (4.17 mV/µs), that is, an SR threshold of the reference voltage provided by the reference voltage generation circuit 14 is 25 nA/60 pF.

In addition, to meet the condition of tSinkDischargeFull≤50 ms, in this embodiment, the comparator COMP is used to detect whether $V_{BUS}$ is less than 12V, and when VBUS is less than 12V, the second NMOS M2 is enabled, to pull $V_{BUS}$ down quickly.

The circuit provided in this embodiment further includes a third control circuit (not shown in FIG. 5). The third control circuit (e.g., means for adjusting) provides enable signals (EN) for the comparator COMP and the error amplifier A0, and provides a disable signal (ENB) for the switch K0.

Initially, the switch K0 is in an on state and, when discharging is used, the third control circuit provides enable signals (EN) for the comparator COMP and the error amplifier A0, such that the comparator COMP and the error amplifier A0 start to work, and meanwhile, provides a disable signal (ENB) to the switch K0, to switch off the switch K0.

Thereafter, VBUS is discharged from 21.5 V by using the first NMOS M1. In the discharge process, the comparator COMP compares VBG (1.2 V) with VF in real time. When VBUS is in the range of 21.5 V to 12 V, the comparator COMP outputs a logic low level, and still outputs a logic low level after the action of the first inverter INV1 and the second inverter INV2. Such a logic low level turns off the second NMOS M2. In this range, only the first NMOS M1 is used to discharge VBUS. At this point, the magnitude of the first NMOS M1 is relatively small in consideration of the power consumption (less than 0.86 W). After VBUS is less than 12 V, the comparator COMP outputs a logic high level, and still outputs a logic high level after the action of the first inverter INV1 and the second inverter INV2, such that the second NMOS M2 is switched on. In this stage, the first NMOS M1 and the second NMOS M2 are used to discharge VBUS. At this point, the magnitude of the second NMOS M1 is large in consideration of the power consumption (less than 0.86 W) and the discharge time (tSinkDischarge-Full≤50 ms), thereby quickly pulling down VBUS to a corresponding safe working voltage.

The magnitudes of the first NMOS M1 and the second NMOS M2 may be determined through simulation experiments.

In the discharge process, the switch K0 is switched off to enable the reference voltage generation circuit 14 to start working, generate a corresponding reference voltage VR (variable, that is, having a certain SR), and output it to the error amplifier A0. The error amplifier A0 (e.g., means for detecting) compares VF with VR, when VF is greater than or equal to VR (the SR of VBUS is relatively low), a logic high level is output to raise VG, thereby increasing the pull down capacity of the discharge load 11 to quickly pull down VBUS, so as to increase the SR of VBUS; and when VF is less than VR (the SR of the VBUS is relatively high), a logic low level is output to reduce VG, thereby reducing the pull down capacity of the discharge load 11, to reduce the SR of VBUS.

It can be seen from the above description that, the illustrated embodiment adopts two discharge branches to discharge VBUS. Specifically, when VBUS is a high voltage (e.g., 21.5 V to 12 V), the smaller first NMOS M1 is used for discharging, and in this way, the power consumption generated in the discharge process may be effectively reduced. When VBUS is a low voltage (e.g., less than 12 V), the smaller first NMOS M1 and the greater second NMOS M2 are used for discharging simultaneously, and the greater NMOS M2 can quickly pull down VBUS to the safe working voltage, so as to effectively control the discharge time (tSinkDischargeFull≤50 ms).

At the same time, the illustrated embodiment uses the error amplifier A0 to form a negative feedback loop, and therefore, the SR of VBUS can be controlled effectively (vSrcSlewNeg≤30 mV/μs).

Based on the discharge circuit in the above embodiment, an embodiment provides a USB interface detection circuit, which is mounted on the USB connector, and the USB interface detection circuit includes the discharge circuit.

The USB interface detection circuit may be applied to a DFP device, a UFP device and a DRP device (it is operated as a DFP device when being connected to a UFP device, and operated as a UFP device when being connected to a DFP device). In an embodiment, the USB interface detection circuit may be included in an integrated circuit. For example, the integrated circuit with the USB interface detection circuit may be included in a USB connector.

The solution provided in this embodiment can be applied in the following scenarios: a power source adapter (Source) and a personal computer (PC) (Sink), and in this case, the power source adapter is a DFP device, the PC is a UFP device, and when the PC is charged by using the power source adapter, the power source adapter negotiates with the PC about a charging current and a charging voltage on the basis of power communication protocols of USB power delivery (PD), and then the power source adapter supplies power to the PC through the VBUS pin and the cable on the basis of the negotiated charging voltage and charging current. After the removal of the cable connected between the power source adapter and the PC, the voltage of the VBUS pin needs to be discharged.

Other application scenarios may also be conceived of, such as a mobile power source and a computer, and a computer and other high-power equipment (such as a charger). Based on the discharge circuit for a USB connector described herein, an embodiment may further provide a discharge method for a USB connector, as shown in FIG. 7.

Figure 7:
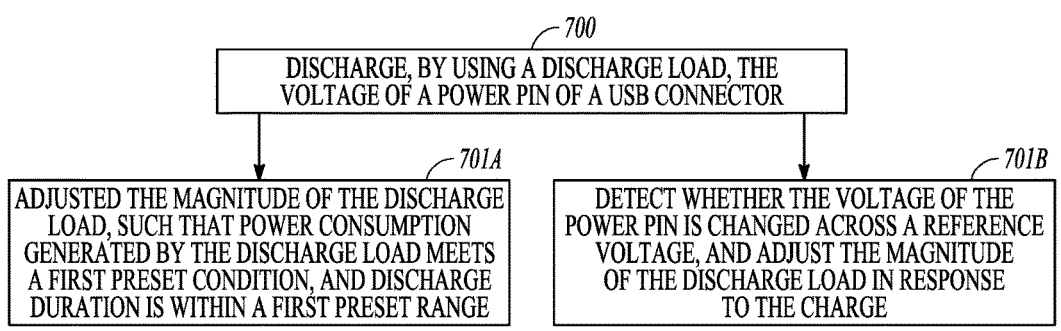
FIG. 7 illustrates a flow diagram of a discharge method for a USB connector according to an embodiment.

FIG. 7 illustrates a flow diagram of a discharge method for a USB connector according to an embodiment. In block 700, the method discharges, by using a discharge load, the voltage of a first pin of the USB connector. In block 701a, the method adjusts the magnitude of the discharge load during discharging, such that power consumption generated by the discharge load meets a first preset condition, and discharge time is within a first preset range, the first preset condition indicating that the generated power consumption does not trigger OTP.

In block 701b, the method detects whether the voltage of the first pin is changed based on a reference voltage, and adjust the magnitude of the discharge load in response to the change, such that a slew rate of the voltage of the first pin is within a second preset range.

In an embodiment, the first preset condition needs to be set according to related parameters (including a triggering threshold, a thermal resistance of the circuit, a max ambient environment temperature, and the like) triggering the OTP of the circuit. The first preset range and the second preset range may be set according to specifications of the USB related protocols.

In an embodiment, the discharge load includes: a first discharge load and a second discharge load. The first discharge load can be less than the second discharge load. Correspondingly, the magnitude of the discharge load is adjusted during discharging, such that power consumption generated by the discharge load meets the first preset condition, and the discharge time is within the first preset range; it is detected whether the voltage of the first pin is less than the first threshold, and an enable signal is generated when the detection result indicates that the voltage of the first pin is less than the first threshold, to discharge the voltage of the first pin by using the first discharge load and the second discharge load.

In an example, when the voltage of the first pin is relatively high, the first discharge load having a smaller magnitude is used for discharging, and in this way, power consumption may be reduced effectively. When the voltage of the first pin is reduced to a certain value, the first discharge load and the second discharge load that has a larger magnitude are used together to discharge the voltage of the first pin simultaneously, and in this way, the discharge process can be completed quickly, thereby meeting the requirement on the discharge time specified in the USB protocol. The magnitudes of the first discharge load and the second discharge load may be determined through simulation experiments.

In an embodiment, the method may further include: generating the reference voltage during discharging, the generated reference voltage being variable and greater than a second threshold.

In an embodiment, the second threshold is set based on factors such as the magnitude of a discharge current, normal work of the circuit, and an SR specified by the protocol. The adjusting the magnitude of the discharge load in response to the change specifically includes: increasing the discharge load when the voltage of the first pin is greater than the reference voltage; and reducing the discharge load when the voltage of the first pin is lower than the reference voltage.

When the voltage of the first pin is greater than the reference voltage, it indicates that the SR of the voltage of the first pin is less than the SR of the reference voltage, and at this point, the discharge load 11 needs to be increased, to quickly pull down the voltage of the first pin, thereby increasing the SR of the voltage of the first pin. When the voltage of the first pin is less than the reference voltage, it indicates that the SR of the voltage of the first pin is greater than the SR of the reference voltage, and at this point, the discharge load 11 needs to be reduced, to reduce the capacity of pulling down the voltage of the first pin, thereby reducing the SR of the voltage of the first pin.

Figure 8:
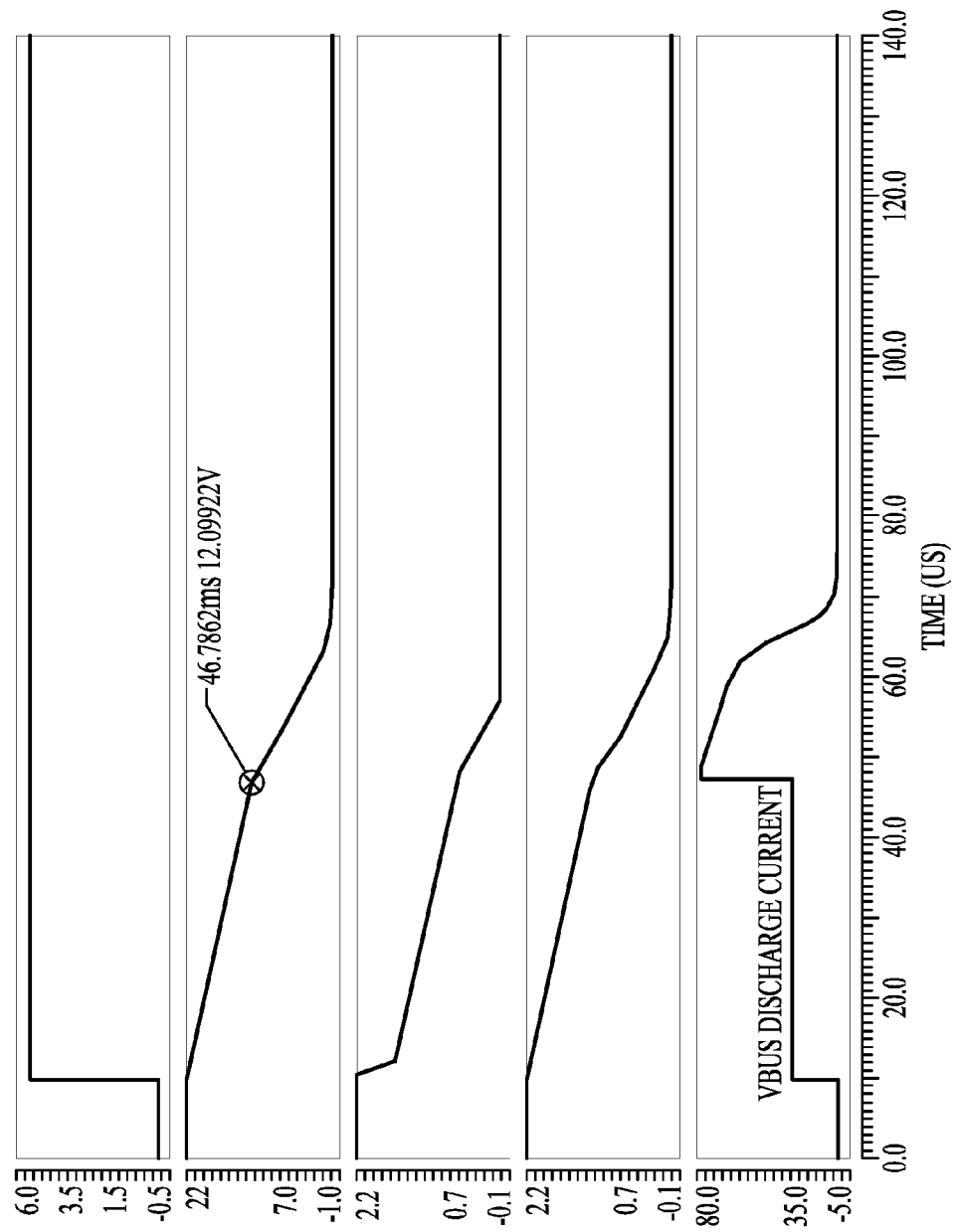
FIG. 8 illustrates a plot of simulation results using the circuit shown in FIG. 5.

To better illustrate that the discharge process can be effectively controlled, a simulation experiment is carried out by using the discharge circuit shown in FIG. 5, and FIG. 8 shows the simulation result. It can be seen from the simulation waveform shown in FIG. 7 that when VBUS is less than 12V, another discharge branch (the second NMOS M2) is enabled, to quickly pull down VBUS to the safe working voltage; meanwhile, the SR of VBUS is controlled in a range less than 30 mV/μs, can indicate that the discharge circuit for a USB connector according to an embodiment may effectively control the discharge process. In FIG. 8, curves from top to bottom are: a curve of variation of an enable signal (EN) over time, a curve of variation of VBUS over time, a curve of variation of VR over time, a curve of variation of VF over time, and a curve of variation of a VBUS pin voltage discharge current over time, respectively.

Additional Notes

An example (e.g., "Example 1") of subject matter (e.g., a system) may comprise: a discharge circuit for discharging a voltage from a pin of a USB connector, the discharge circuit comprising a discharge load coupled to the pin and configured to discharge the voltage on the pin; a first control circuit coupled to the discharge load and configured to adjust a magnitude of the discharge load during discharging, such that a power consumption of the discharge load meets a first preset condition, and a discharge time is within a first preset range, the first preset condition indicating that the generated power consumption does not trigger Over Temperature Protection (OTP); and a second control circuit coupled to the discharge load and configured to detect whether the voltage of the pin is changed based on a reference voltage during discharging and adjust the magnitude of the discharge load in response to the change, such that a slew rate of the voltage of the pin is within a second preset range.

In Example 2, the subject matter of Example 1 may optionally be configured such that the first control circuit is configured to detect whether the voltage of the pin is less than a first threshold and to generate an enable signal when the detection result indicates that the voltage of the pin is less than the first threshold.

In Example 3, the subject matter of any one or more of Examples 1-2 may optionally be configured such that the discharge load comprises: a first discharge load configured to discharge the voltage of the pin; and a second discharge load configured to discharge the voltage of the pin in response to an enable signal, wherein the first discharge load is less than the second discharge load.

In Example 4, the subject matter of any one or more of Examples 1-3 may optionally be configured such that the second control circuit is configured to increase the discharge load when the voltage of the pin is greater than the reference voltage.

In Example 5, the subject matter of any one or more of Examples 1-4 may optionally be configured such that the second control circuit is configured to reduce the discharge load when the voltage of the first pin is lower than the reference voltage.

In Example 6, the subject matter of any one or more of Examples 1-5 may optionally be configured to comprise a third control circuit coupled to the first and second control circuits, the third control circuit configured to provide enable signals to the first control circuit and the second control circuit.

In Example 7, the subject matter of any one or more of Examples 1-6 may optionally be configured to comprise a reference voltage generation circuit coupled to the second control circuit, the reference voltage generation circuit configured to provide a variable reference voltage to the second control circuit during discharging, the provided variable reference voltage being greater than a second threshold.

An example (e.g., "Example 8") of subject matter (e.g., a method for discharging a USB connector) may comprise: discharging, with a discharge load, the voltage on a pin of the USB connector; adjusting a magnitude of the discharge load during the discharging such that a power consumption generated by the discharge load meets a first preset condition and a discharge time is within a first preset range, the first preset condition indicating that the generated power consumption does not trigger Over Temperature Protection (OTP); detecting a voltage change on the pin based on a reference voltage; and adjusting the magnitude of the discharge load in response to the voltage change, such that a slew rate of the voltage of the pin is within a second preset range.

In Example 9, the subject matter of any one or more of Examples 1-8 may optionally be configured such that the discharge load comprises a first discharge load and a second discharge load, wherein the first discharge load is less than the second discharge load and adjusting the magnitude of the discharge load during discharging comprises: detecting whether the voltage on the pin is less than a first threshold; and generating an enable signal when the detection result indicates that the voltage of the pin is less than the first threshold, to discharge the voltage of the first pin using the first discharge load and the second discharge load.

In Example 10, the subject matter of any one or more of Examples 1-9 may optionally be configured such that adjusting the magnitude of the discharge load in response to the change comprises: reducing the discharge load when the voltage of the pin is greater than the reference voltage.

In Example 11, the subject matter of any one or more of Examples 1-10 may optionally be configured such that adjusting the magnitude of the discharge load in response to the change comprises: increasing the discharge load when the voltage of the pin is less than the reference voltage.

In Example 12, the subject matter of any one or more of Examples 1-11 may optionally be configured to comprise generating the reference voltage during discharging, the generated reference voltage being variable and greater than a second threshold.

An example (e.g., "Example 13") of subject matter (e.g., a system) may comprise: means for discharging a voltage on a pin of a USB connector; means for adjusting a magnitude of the means for discharging such that power consumption generated by the means for discharging meets a first preset condition and a discharge time is within a first preset range, the first preset condition indicating that the generated power consumption does not trigger Over Temperature Protection (OTP); means for detecting a voltage change on the pin based on a reference voltage; and means for adjusting the magnitude of the means for discharging in response to the voltage change, such that a slew rate of the voltage of the pin is within a second preset range.

In Example 14, the subject matter of any one or more of Examples 1-13 may optionally be configured such that the means for adjusting the magnitude of the means for discharging is configured to adjust the magnitude during the discharging of the voltage.

In Example 15, the subject matter of any one or more of Examples 1-14 may optionally be configured such that the means for discharging comprises first and second transistors coupled in parallel.

In Example 16, the subject matter of any one or more of Examples 1-15 may optionally be configured such that the means for adjusting is configured to turn on the first transistor when the voltage is greater than a reference voltage.

In Example 17, the subject matter of any one or more of Examples 1-16 may optionally be configured such that the means for adjusting is configured to turn on the first and the second transistors when the voltage is less than the reference voltage.

In Example 18, the subject matter of any one or more of Examples 1-17 may optionally be configured such that the means for detecting comprises: a voltage divider circuit coupled to the pin and configured to generate an error voltage; and an error amplifier having an input coupled to the voltage divider circuit and configured to generate a first transistor enable signal.

In Example 19, the subject matter of any one or more of Examples 1-18 may optionally be configured such that the means for adjusting further comprises a comparator having an input coupled to a reference voltage node and configured to generate a second transistor enable signal in response to the voltage being less than a reference voltage on the reference voltage node.

In Example 20, the subject matter of any one or more of Examples 1-19 may optionally be configured such that the USB connector comprises a Type-C USB connector and the pin comprises a VBUS pin.

The above descriptions are merely specific implementation manners of the present invention, the protection scope of the present invention is not limited thereto, and variations or replacements that can be easily derived by persons skilled in the art without departing from the technical scope disclosed in the present invention shall fall within the protection scope of the present invention. Therefore, the protection scope of the present invention shall be subject to the protection scope of the claims.

The above descriptions include references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. If two elements are shown in the drawings with a line connecting them, the two elements can be either be coupled, or directly coupled, unless otherwise indicated. If two elements are coupled, one or more intervening elements may be present. In contrast, in embodiments where an element is referred to as "directly coupled" to another element, there can be no intervening elements in those embodiments.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A discharge circuit for discharging a voltage from a pin of a USB connector, the discharge circuit comprising:
   a discharge load coupled to the pin and configured to discharge the voltage on the pin;
   a first control circuit coupled to the discharge load and configured to adjust a magnitude of the discharge load during discharging, such that a power consumption of the discharge load meets a first preset condition, and a discharge time is within a first preset range, the first preset condition indicating that the generated power consumption does not trigger Over Temperature Protection (OTP); and
   a second control circuit coupled to the discharge load and configured to detect whether the voltage of the pin is changed based on a reference voltage during discharging and adjust the magnitude of the discharge load in response to the change, such that a slew rate of the voltage of the pin is within a second preset range.

2. The discharge circuit of claim 1, wherein the first control circuit is configured to detect whether the voltage of the pin is less than a first threshold and to generate an enable signal when the detection result indicates that the voltage of the pin is less than the first threshold.

3. The discharge circuit of claim 2, wherein the discharge load comprises:
a first discharge load configured to discharge the voltage of the pin; and
a second discharge load configured to discharge the voltage of the pin in response to an enable signal,
wherein the first discharge load is less than the second discharge load.

4. The discharge circuit of claim 1, wherein the second control circuit is configured to increase the discharge load when the voltage of the pin is greater than the reference voltage.

5. The discharge circuit of claim 1, wherein the second control circuit is configured to reduce the discharge load when the voltage of the first pin is lower than the reference voltage.

6. The discharge circuit of claim 1, further comprising a third control circuit coupled to the first and second control circuits, the third control circuit configured to provide enable signals to the first control circuit and the second control circuit.

7. The discharge circuit of claim 1, further comprising:
a reference voltage generation circuit coupled to the second control circuit, the reference voltage generation circuit configured to provide a variable reference voltage to the second control circuit during discharging, the provided variable reference voltage being greater than a second threshold.

8. The method of claim 7, wherein adjusting the magnitude of the discharge load in response to the change comprises:
reducing the discharge load when the voltage of the pin is greater than the reference voltage.

9. The method of claim 7, wherein adjusting the magnitude of the discharge load in response to the change comprises:
increasing the discharge load when the voltage of the pin is less than the reference voltage.

10. The method of claim 7, further comprising:
generating the reference voltage during discharging, the generated reference voltage being variable and greater than a second threshold.

11. A method for discharging a USB connector, the method comprising:
discharging, with a discharge load, the voltage on a pin of the USB connector;
adjusting a magnitude of the discharge load during the discharging such that a power consumption generated by the discharge load meets a first preset condition and a discharge time is within a first preset range, the first preset condition indicating that the generated power consumption does not trigger Over Temperature Protection (OTP);
detecting a voltage change on the pin based on a reference voltage; and
adjusting the magnitude of the discharge load in response to the voltage change, such that a slew rate of the voltage of the pin is within a second preset range.

12. The method of claim 11, wherein the discharge load comprises a first discharge load and a second discharge load,
wherein the first discharge load is less than the second discharge load, and
wherein adjusting the magnitude of the discharge load during discharging comprises:
detecting whether the voltage on the pin is less than a first threshold; and
generating an enable signal when the detection result indicates that the voltage of the pin is less than the first threshold, to discharge the voltage of the first pin using the first discharge load and the second discharge load.

13. A system comprising:
means for discharging a voltage on a pin of a USB connector;
means for adjusting a magnitude of the means for discharging such that power consumption generated by the means for discharging meets a first preset condition and a discharge time is within a first preset range, the first preset condition indicating that the generated power consumption does not trigger Over Temperature Protection (OTP);
means for detecting a voltage change on the pin based on a reference voltage; and
means for adjusting the magnitude of the means for discharging in response to the voltage change, such that a slew rate of the voltage of the pin is within a second preset range.

14. The system of claim 13, wherein the means for adjusting the magnitude of the means for discharging is configured to adjust the magnitude during the discharging of the voltage.

15. The system of claim 13, wherein the means for discharging comprises first and second transistors coupled in parallel.

16. The system of claim 15, wherein the means for adjusting is configured to turn on the first transistor when the voltage is greater than a reference voltage.

17. The system of claim 16, wherein the means for adjusting is configured to turn on the first and the second transistors when the voltage is less than the reference voltage.

18. The system of claim 17, wherein the means for detecting comprises:
a voltage divider circuit coupled to the pin and configured to generate an error voltage; and
an error amplifier having an input coupled to the voltage divider circuit and configured to generate a first transistor enable signal.

19. The system of claim 18, wherein the means for adjusting further comprises a comparator having an input coupled to a reference voltage node and configured to generate a second transistor enable signal in response to the voltage being less than a reference voltage on the reference voltage node.

20. The system of claim 13, wherein the USB connector comprises a Type-C USB connector and the pin comprises a VBUS pin.

* * * * *